(12) United States Patent
Saito

(10) Patent No.: US 11,090,678 B2
(45) Date of Patent: Aug. 17, 2021

(54) EXHAUST/DRAINAGE MECHANISM

(71) Applicant: TRINITY INDUSTRIAL CORPORATION, Toyota (JP)

(72) Inventor: Ryota Saito, Toyota (JP)

(73) Assignee: TRINITY INDUSTRIAL CORPORATION, Toyota (JP)

( * ) Notice: Subject to any disclaimer, the term of this patent is extended or adjusted under 35 U.S.C. 154(b) by 0 days.

(21) Appl. No.: 16/321,650

(22) PCT Filed: Aug. 31, 2017

(86) PCT No.: PCT/JP2017/031431
§ 371 (c)(1),
(2) Date: Jan. 29, 2019

(87) PCT Pub. No.: WO2018/061604
PCT Pub. Date: Apr. 5, 2018

(65) Prior Publication Data
US 2019/0329284 A1 Oct. 31, 2019

(30) Foreign Application Priority Data

Sep. 29, 2016 (JP) ............................. JP2016-190503

(51) Int. Cl.
*B01D 45/12* (2006.01)
*B05B 13/04* (2006.01)
(Continued)

(52) U.S. Cl.
CPC .............. *B05C 11/10* (2013.01); *B01D 45/12* (2013.01); *B05B 13/0447* (2013.01); *B05B 14/462* (2018.02); *C02F 1/40* (2013.01)

(58) Field of Classification Search
CPC ........ B05C 11/10; C02F 1/40; C02F 2103/18; B05B 13/0447; B05B 14/462; B05B 13/0452; B01D 45/12
(Continued)

(56) References Cited

U.S. PATENT DOCUMENTS 3,516,230 A * 6/1970 Saubesty ............... B05B 14/468
96/238
3,964,886 A * 6/1976 Engalitcheff, Jr. .... B01D 47/06
96/238
(Continued)

FOREIGN PATENT DOCUMENTS

JP       S51-134873 U    10/1976
JP       H05-028490 U    4/1993
(Continued)

OTHER PUBLICATIONS

Apr. 2, 2019 International Preliminary Report on Patentability issued in International Patent Application No. PCT/JP2017/031431.
(Continued)

*Primary Examiner* — Nam X Nguyen
*Assistant Examiner* — Ekandra S. Miller-Cruz
(74) *Attorney, Agent, or Firm* — Oliff PLC

(57) ABSTRACT

An exhaust/drainage mechanism includes an exhaust channel guiding contaminated air discharged from a coating booth with non-attached paint; a drainage channel guiding contaminated water discharged from the booth; a scum receiving inlet included in the drainage channel and into which the floating coating scum floating on the contaminated water flows; and a dual-purpose flow channel used as both the exhaust and drainage channel. The contaminated air flows through an upper part of the dual-purpose flow channel, and the contaminated water flows through a lower part. A wind pressure of the contaminated air generates, in an (Continued)

upper part of the contaminated water, an upper-layer flow flows in a direction or at a velocity different from a direction or a velocity of a flow in a lower part of the contaminated water. A dynamic pressure of the upper-layer flow pushes and moves the floating coating scum to the scum receiving inlet.

4 Claims, 5 Drawing Sheets

(51) Int. Cl.
    *C02F 1/40* (2006.01)
    *B05C 11/10* (2006.01)
    *B05B 14/462* (2018.01)
(58) Field of Classification Search
    USPC .......................................................... 210/787
    See application file for complete search history.

(56) References Cited

U.S. PATENT DOCUMENTS

| | | | | | |
|---|---|---|---|---|---|
| 4,545,295 | A | * | 10/1985 | Russell | B03D 1/24 |
| | | | | | 454/54 |
| 4,610,785 | A | * | 9/1986 | Russell | B01D 21/02 |
| | | | | | 210/195.1 |
| 4,626,357 | A | * | 12/1986 | Finger | C02F 1/32 |
| | | | | | 134/109 |
| 5,372,711 | A | * | 12/1994 | Sill | B01D 21/01 |
| | | | | | 210/122 |
| 5,741,178 | A | * | 4/1998 | Telchuk | B01D 47/06 |
| | | | | | 454/54 |

FOREIGN PATENT DOCUMENTS

| | | | | | |
|---|---|---|---|---|---|
| JP | H05-146727 | A | | 6/1993 | |
| JP | H07-185394 | A | | 7/1995 | |
| JP | H07185394 | A | * | 7/1995 | ............... B04C 3/00 |
| JP | H08-309263 | A | | 11/1996 | |
| JP | H08309263 | A | * | 11/1996 | ............ B05B 15/04 |
| JP | H09-314025 | A | | 12/1997 | |
| JP | 2000140872 | A | * | 5/2000 | ................ C02F 3/06 |
| JP | 2000140872 | A | * | 5/2000 | ................ C02F 3/06 |
| JP | 2003-205286 | A | | 7/2003 | |
| JP | 2004-057968 | A | | 2/2004 | |
| JP | 2014-046262 | A | | 3/2014 | |
| JP | 2014-180657 | A | | 9/2014 | |
| JP | J 2014180657 | A | * | 9/2014 | ............ B01D 53/18 |
| JP | 2014-226609 | A | | 12/2014 | |
| JP | 5842876 | B2 | | 1/2016 | |
| KR | 10-2012-0108283 | A | | 10/2012 | |

OTHER PUBLICATIONS

Nov. 14, 2017 International Search Report issued in International Patent Application No. PCT/JP2017/031431.

May 12, 2020 Office Action issued in Japanese Patent Application No. 2016-190503.

May 28, 2020 Office Action issued in Chinese Patent Application No. 201780045458.0.

* cited by examiner

EXHAUST/DRAINAGE MECHANISM

TECHNICAL FIELD

The present invention relates to an exhaust/drainage mechanism having an exhaust channel and a drainage channel for contaminated air and contaminated water discharged from a coating booth.

BACKGROUND ART

Conventionally, as this type of exhaust/drainage mechanism, there is known a mechanism in which a scum receiving inlet is provided at the upper edge part of a tank provided in a drainage channel, and floating coating scum floating on the upper surface in the tank flows into the scum receiving inlet due to overflow of contaminated water (for example, see Patent Literature 1).

CITATIONS LIST

Patent Literature

Patent Literature 1: Japanese Patent Application Publication No.: JP 2014-226609 A (paragraph [0028])

SUMMARY OF INVENTION

Technical Problems

However, in the conventional exhaust/drainage mechanism described above, floating coating scum is scattered, and much contaminated water not containing floating coating scum flows into the scum receiving inlet in some cases. That is, in the conventional exhaust/drainage mechanism, there is a problem that floating coating scum cannot be efficiently collected.

The present invention has been made in view of the above issue, and an object of the present invention is to provide an exhaust/drainage mechanism capable of efficiently collecting floating coating scum.

Solutions to Problems

An exhaust/drainage mechanism according to the present disclosure conceived to achieve the above object includes: an exhaust channel which guides contaminated air discharged from a coating booth together with non-attached paint; a drainage channel which guides contaminated water discharged from the coating booth together with non-attached paint; a scum receiving inlet which is provided in the drainage channel and into which the floating coating scum floating on the contaminated water flows; and a dual-purpose flow channel which is used as both of the exhaust channel and the drainage channel. The contaminated air flows through an upper part of the dual-purpose flow channel. The contaminated water flows through a lower part of the dual-purpose flow channel. A wind pressure of the contaminated air generates, in an upper part of the contaminated water, an upper-layer flow which flows in a direction or at a velocity different from a direction or a velocity of a flow in a lower part of the contaminated water. A dynamic pressure of the upper-layer flow pushes and moves the floating coating scum to the scum receiving inlet.

DESCRIPTION OF EMBODIMENTS

First Embodiment

Figure 1:
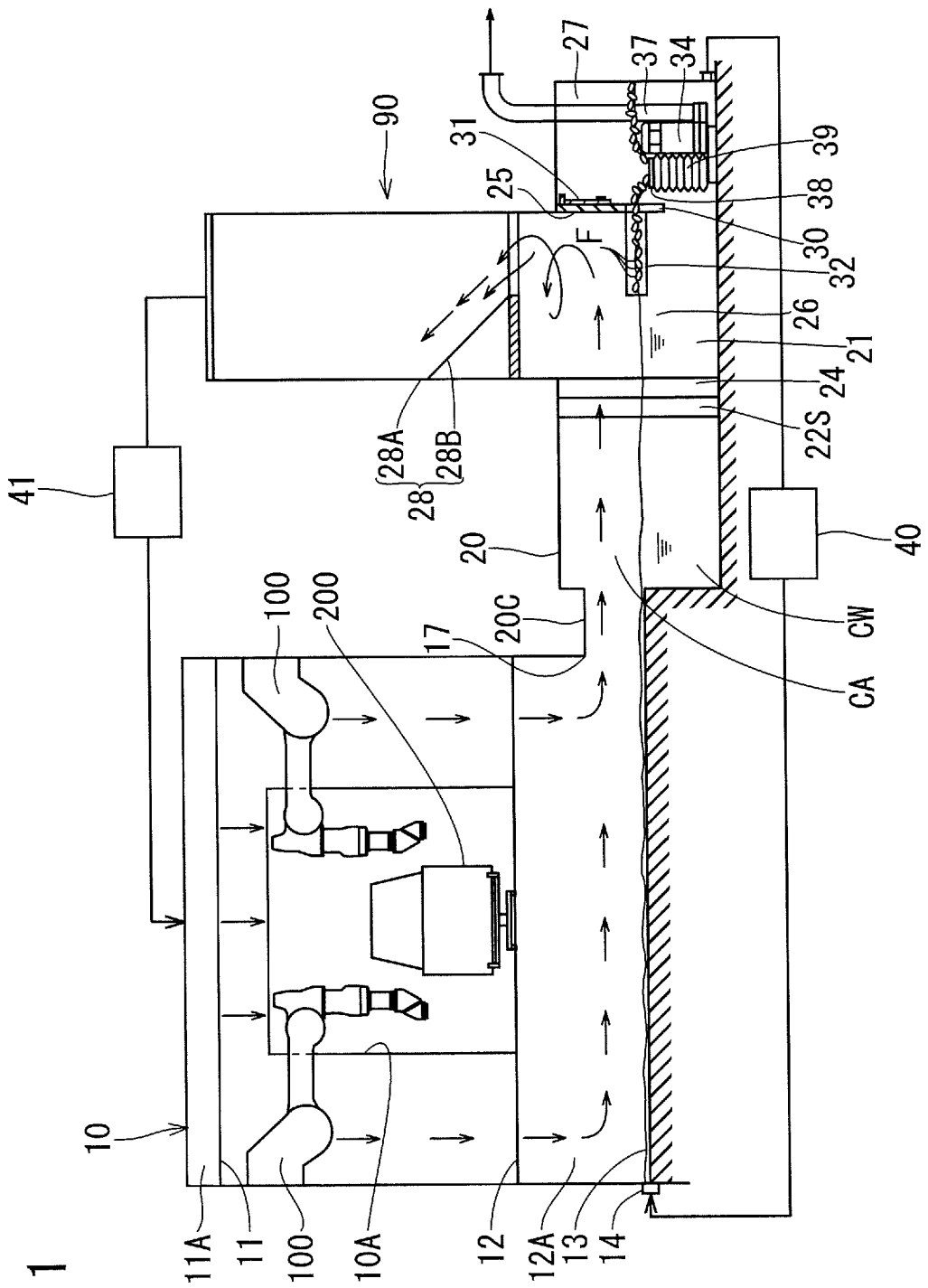
FIG. 1 is a side sectional view of a coating booth according to a first embodiment of the present invention.

Hereinafter, an embodiment of the present invention will be described with reference to FIGS. 1 to 3. With reference to FIG. 1, reference sign 10 denotes a coating booth, and the coating booth is, for example, in the shape of a substantially rectangular parallelepiped and has a loading and unloading port 10A for loading and unloading a workpiece 200 in front. Further, inside the coating booth 10, there is installed a painting robot 100. When the workpiece 200 is conveyed to the front of the painting robot 100 by a conveyance device (not shown), atomized paint is sprayed from a paint gun of the painting robot 100, and the workpiece 200 is painted. It should be noted that the loading and unloading port 10A is closed with an air curtain so that outside air cannot enter.

A ceiling board 11 of the coating booth 10 has a mesh structure, for example, and the floor board 12 has a mesh structure which is rougher than the ceiling board 11. Further, under the floor board 12, there is provided an underfloor space 12A, and a discharge port 17 is formed in a lower part of one side surface of a surrounding wall surrounding the underfloor space 12A. Then, pressurized air is supplied into a ceiling space 11A, an airflow goes down from the ceiling board 11 and flows into the underfloor space 12A together with non-attached paint. Then, the contaminated air CA including the non-attached paint is discharged from the discharge port 17 to the outside of the coating booth 10.

An underfloor surface 13 is opposed to the floor board 12 from the lower side with the underfloor space 12A therebetween, and the underfloor surface 13 is inclined downward toward one side edge on the discharge port 17 side. A plurality of fountain parts 14 are provided on a side edge, of the underfloor surface 13, opposite to the discharge port 17, and water containing an aggregating agent is ejected from the fountain parts 14 to the underfloor surface 13, so that the entire underfloor surface 13 is filled with water. Then, the water on the underfloor surface 13 takes in the non-attached paint and becomes contaminated water CW, and the contaminated water CW is discharged from the discharge port 17 to the outside.

The above discharge port 17 extends in the horizontal direction along one side surface of the coating booth 10. Then, the contaminated air CA and the contaminated water CW discharged from the discharge port 17 flow into an exhaust/drainage mechanism 90 according to the present invention. The exhaust/drainage mechanism 90 includes a relay duct 20C, a first flow channel 20, a second flow channel 21, a dust separator 28, and the like which will be described below. The first flow channel 20 has a duct shape having, for example, a rectangular cross section and extends along one side surface of the coating booth 10. The first flow channel 20 communicates with the underfloor space 12A through the relay duct 20C extendingly provided on the side of the coating booth 10.

Figure 2:
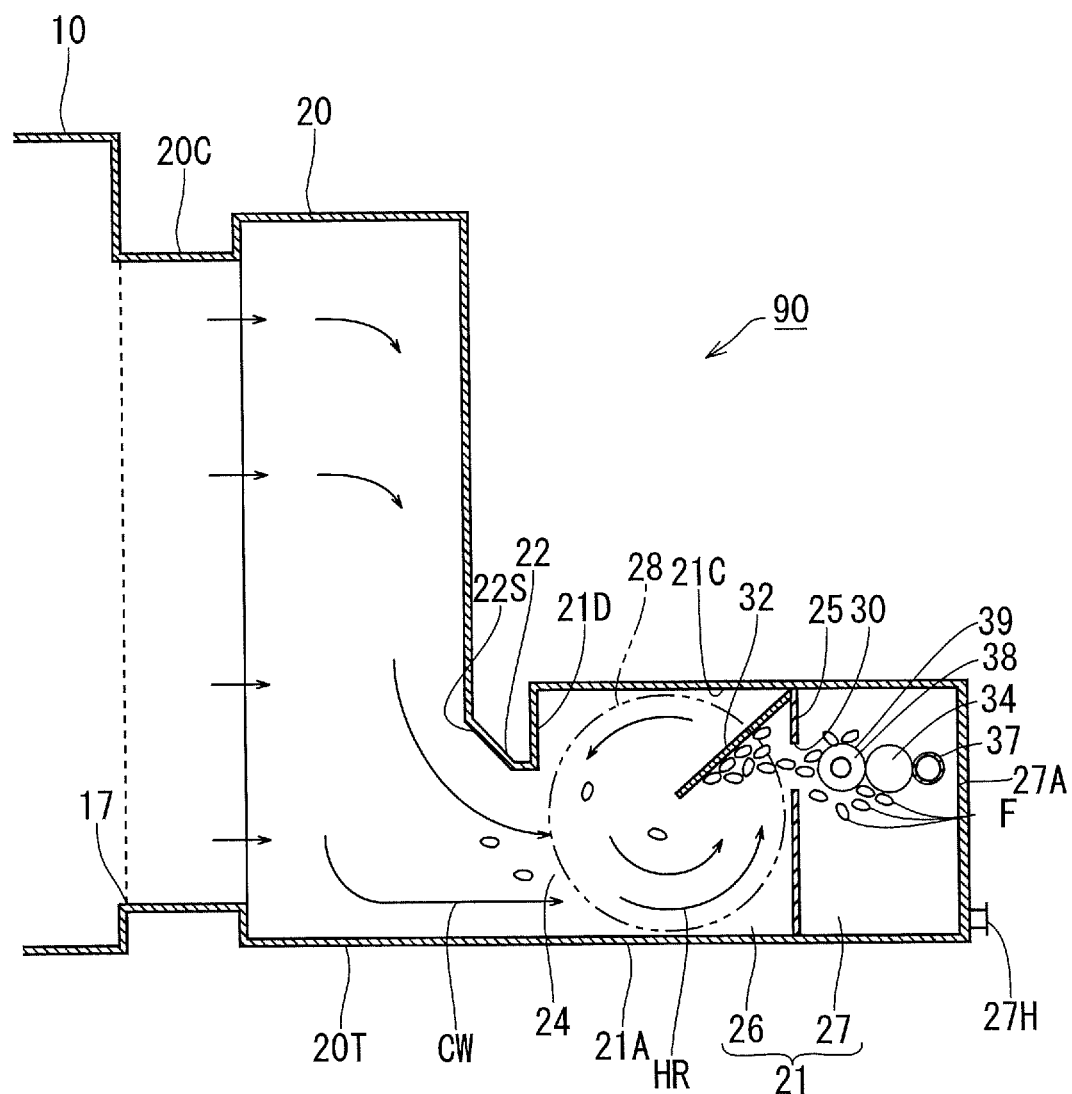
FIG. 2 is a plan sectional view of an exhaust/drainage mechanism provided outside the coating booth.

As shown in FIG. 2, the second flow channel 21 is continued to one end part of the first flow channel 20. The second flow channel 21 has substantially the same horizontal width as the horizontal width of the first flow channel 20 and extends in a direction orthogonal to the first flow channel 20. Further, an end part of the second flow channel 21 on the side of the first flow channel 20 is narrowed by an internal protruding wall 22. The internal protruding wall 22 protrudes inward from an inside corner part which is of the second flow channel 21 and intersects with the first flow channel 20, and the internal protruding wall 22 and an inner side surface 21A of the second flow channel 21 (hereinafter, referred to as "first inner side surface 21A" in order to be distinguished from the other inner side surface) ahead of the internal protruding wall 22 constitute a passing part 24 according to the present invention. Then, as described later, the contaminated water CW in the first flow channel 20 flows into the second flow channel 21 side through the passing part 24. At this time, in order to allow the contaminated water CW flowing along the longitudinal direction in the first flow channel 20 to change its direction and smoothly flow toward the passing part 24 side, there is formed an inclined surface 22S on the side of the first flow channel 20 at an end part of the internal protruding wall 22. In the present embodiment, the first flow channel 20, the second flow channel 21, and the relay duct 20C constitute a "dual-purpose flow channel" according to the present invention.

In the second flow channel 21, a separation wall 25 is provided in a middle part in the longitudinal direction, and the second flow channel 21 is divided by the separation wall 25 into a vortex flow generation chamber 26 (corresponding to an "extended part" of the present invention) on the passing part 24 side and a storage chamber 27 on the opposite side of the vortex flow generation chamber 26. As shown in FIG. 3, the separation wall 25 separates the second flow channel 21 on the side upper than the middle part in the vertical direction, and the vortex flow generation chamber 26 and the storage chamber 27 located below the separation wall 25 communicate with each other. Further, as shown in FIG. 2, in an end wall 27A of the storage chamber 27 distant from the first flow channel 20, a drainage port 27H is provided at a lower end part of the second flow channel 21 on the side of the first inner side surface 21A. Then, the contaminated water CW in the second flow channel 21 is discharged from the drainage port 27H to a water purifier 40 (see FIG. 1), so that the contaminated water CW flows from the first flow channel 20 to the second flow channel 21. In addition, as described above, since the aggregating agent is contained in the water squirted from the fountain parts 14, the coating scum is aggregated to become floating coating scum F containing air before the contaminated water CW reaches the second flow channel 21, and the floating coating scum F flows on the water surface (see FIG. 2 and FIG. 3). In order to surely make the coating scum float and become the floating coating scum F, air may be released from a pipe, for example, on a bottom part of the first or second flow channel 20 or 21 to generate babbles in the contaminated water CW.

As shown in FIG. 2, the vortex flow generation chamber 26 has a substantially square planar shape and extends laterally from the passing part 24. Further, as shown in FIG. 3, a dust separator 28 is provided on an upper part of the vortex flow generation chamber 26. The dust separator 28 includes a helical guide wall 28B and a water spray nozzle (not shown) inside a cylindrical tower 28A rising upward from an upper wall of the vortex flow generation chamber 26. In addition, as shown in FIG. 1, an air purifier 41 is coupled to an upper end part of the cylindrical tower 28A through a suction duct. Then, a blower (not shown) of the air purifier 41 sucks the air, whereby the contaminated air CA flows from the underfloor space 12A through the first flow channel 20, the second flow channel 21, and the dust separator 28 to the air purifier 41. In addition, the contaminated air CA rises while swirling in the dust separator 28, and due to a centrifugal force caused by the swirling, dust mainly constituted by powder of non-attached paint is centrifugally separated from the air and collides with an inner surface of the dust separator 28, so that the dust falls into the vortex flow generation chamber 26 together with water from the water spray nozzle. This arrangement makes it difficult for the dust to accumulate in the dust separator 28, so that it is possible to reduce the frequency of cleaning of the dust separator 28.

As shown in FIG. 2, the contaminated air CA is swirling also in the vortex flow generation chamber 26 below the dust separator 28. Specifically, a part of the contaminated air CA flowing in the first flow channel 20 collides with an inner surface 20T at one end of the first flow channel 20, is then guided by the first inner side surface 21A of the second flow channel 21, and flows into the vortex flow generation chamber 26 from the passing part 24. Further, the passing part 24 is located biased toward the first inner side surface 21A side of an inner side surface 21D (hereinafter, referred to as "third inner side surface 21D") of in the vortex flow generation chamber 26 on the first flow channel 20 side. As a result, the contaminated air CA flowing into the vortex flow generation chamber 26 from the passing part 24 is guided by the first inner side surface 21A, the separation wall 25, the second inner side surface 21C opposing the first inner side surface 21A, and the third inner side surface 21D in this order, and swirls counterclockwise as shown in FIG. 2. Further, a suction port at a lower end part of the dust separator 28 is positioned, for example, above the space between the third inner side surface 21D and the separation wall 25 (see FIG. 1), and the suction port at the lower end part sucks obliquely upward a part of the contaminated air CA flowing from the second inner side surface 21C to the third inner side surface 21D. With this arrangement, a part of the contaminated air CA in the vortex flow generation chamber 26 is sucked into the dust separator 28, while drawing a semicircle in the vortex flow generation chamber 26, and the other part of the contaminated air CA swirls in the vortex flow generation chamber 26. Then, a wind pressure of the swirling flow of the contaminated air CA in the vortex flow generation chamber 26 generates an upper-layer swirling flow HR at an upper part of the contaminated water CW.

Figure 3:
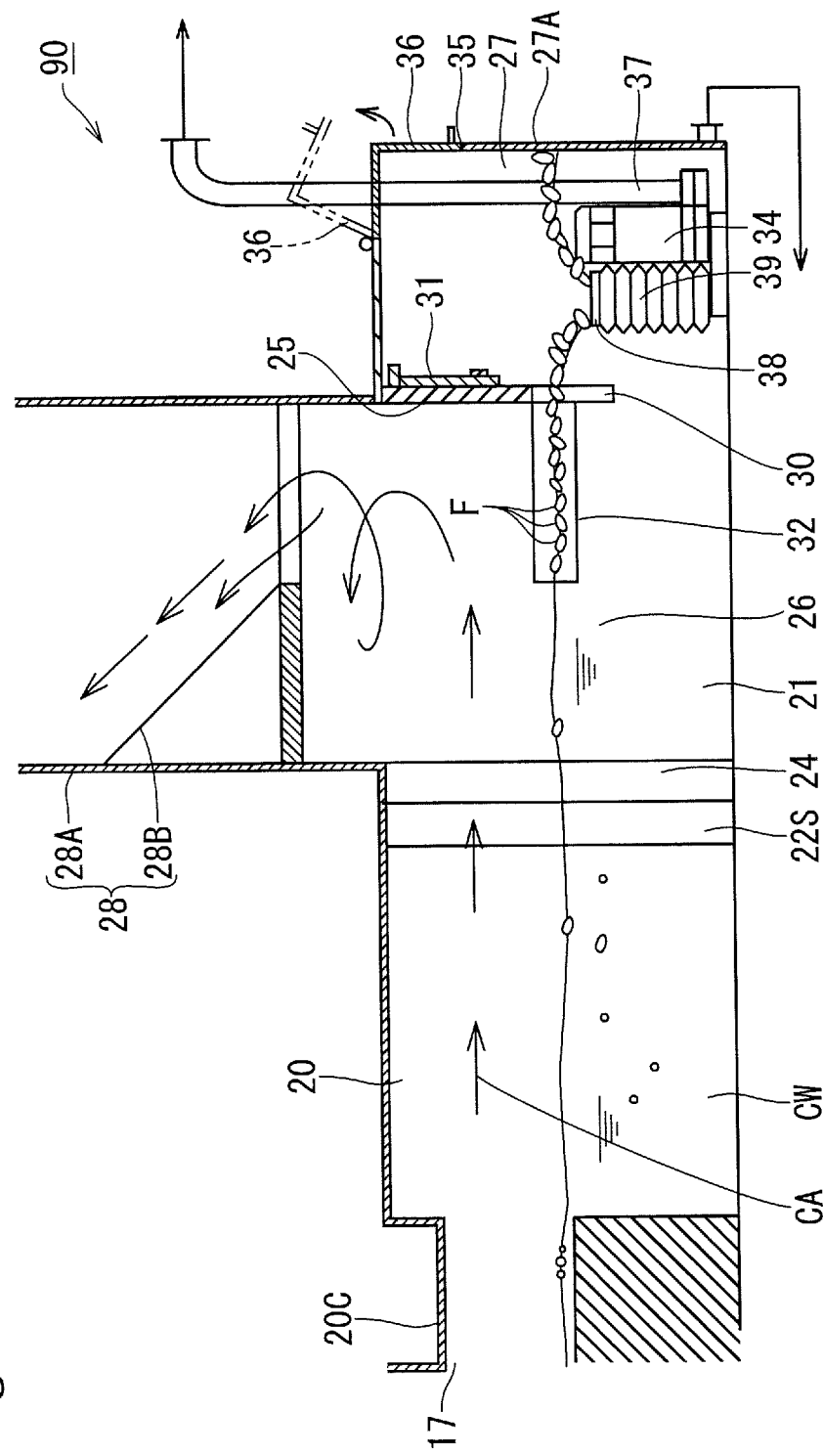
FIG. 3 is a side sectional view of the exhaust/drainage mechanism.

In this arrangement, as shown in FIG. 3, the part, of the contaminated water CW in the second flow channel 21, above the lower end part of the separation wall 25 can swirl in the vortex flow generation chamber 26 also due to the dynamic pressure of the contaminated water CW flowing from the passing part 24 into the second flow channel 21, and in particular, since the contaminated water CW is affected by the wind pressure of the contaminated air CA more at a part closer to the water surface, the upper layer part of the contaminated water CW swirls faster than the middle layer part and the lower layer part of the contaminated water CW. In addition, regarding a part, of the contaminated water CW in the second flow channel 21, lower than the separation wall 25, a part of the contaminated water CW having flown along the first inner side surface 21A from the passing part 24 to the end wall 27A is discharged from the drainage port 27H, and the rest of the contaminated water CW swirls throughout the second flow channel 21. That is, the lower layer part and the middle layer part of the contaminated water CW in the second flow channel 21 flow without obstructing the upper-layer swirling flow HR.

A scum receiving inlet 30 is formed in the separation wall 25 to take in the floating coating scum F from the vortex flow generation chamber 26 into the storage chamber 27. The scum receiving inlet 30 is formed by cutting out a part of the separation wall 25 at a position, for example, closer to the second inner side surface 21C from the lower end to a position above the water surface of the contaminated water CW such that the cut-out part has a rectangular shape.

An internal door 31 for opening and closing the scum receiving inlet 30 is vertically slidably held on the separation wall 25, and the internal door 31 can be opened and closed from the storage chamber 27 side. In addition, a maintenance window 35 is formed in an outer wall of the storage chamber 27, and the maintenance window 35 is normally closed with an external door 36. With this arrangement, when the external door 36 is opened, it is possible to perform maintenance such as cleaning of the storage chamber 27. At this time, by closing the internal door 31, it is possible to prevent outside air from being sucked through the scum receiving inlet 30 into the vortex flow generation chamber 26, and it is thus possible to prevent the negative pressure in the vortex flow generation chamber 26 from being reduced. As a result, it is possible to perform maintenance of the inside of the storage chamber 27 while the coating booth 10 is being operated.

A contaminated water guide 32 is provided in the vortex flow generation chamber 26 to guide the floating coating scum F being circulated in the vortex flow generation chamber 26 by the upper-layer swirling flow HR, into the scum receiving inlet 30. The contaminated water guide 32 has a band plate shape extending from a corner portion between the separation wall 25 and the second inner side surface 21C along the bisector of the corner portion. A lower edge part of the contaminated water guide 32 is above a lower end of the separation wall 25. An upper edge part of the contaminated water guide 32 is above the upper surface of the contaminated water CW and is at substantially the same position as the upper edge part of the scum receiving inlet 30. By the contaminated water guide 32, the flow of the surface layer portion of the upper-layer swirling flow HR is directed to the side of the scum receiving inlet 30, and the floating coating scum F is thus gathered on the side of the scum receiving inlet 30 and flows into the storage chamber 27.

In the storage chamber 27, a suction pump 34 is disposed in the water. A suction pipe 39 attached to the suction pump 34 has a bellows structure, extends vertically on the side of the suction pump 34, and an upper end part of the suction pipe 39 is opened upward. In addition, a float 38 is attached to the upper end part of the suction pipe 39 so as to surround the opening, and the suction pipe 39 extends and contracts in accordance with a change in the water surface of the contaminated water CW (a part of the suction pipe 39 that extends and contracts is an operation part of the present invention), and an upper surface opening of the float 38 is slightly below the surface of the contaminated water CW. The discharge pipe 37 extending from the suction pump 34 and passing through the storage chamber 27 is connected to a coating scum disposal device (not shown) outside the storage chamber 27, and the floating coating scum F floating on the water surface of the storage chamber 27 is sucked by the suction pump 34 and is conveyed to the coating scum disposal device.

The floating coating scum F conveyed to the coating scum disposal device is dehydrated by a dehydrator, is compressed, and is packed in a container and is disposed as industrial waste. Further, the contaminated water CW fed to the above described water purifier 40 (see FIG. 1) is turned into recycled water by filtering out residual coating scum. Then, fresh water is added to the recycled water to adjust the pH, an aggregating agent is further added, and the recycled water is fed to the fountain parts 14. Further, the contaminated air CA fed to the air purifier 41 is filtered to remove powder of paint, is mixed with fresh air to adjust humidity and temperature, and is fed to the ceiling space 11A of the coating booth 10.

The structure and operation of the exhaust/drainage mechanism 90 of the present embodiment has been described above. Next, an effect of the exhaust/drainage mechanism 90 will be described. In the exhaust/drainage mechanism 90, the upper-layer swirling flow HR is generated in the contaminated water CW by the wind pressure in the vortex flow generation chamber 26, and the floating coating scum F is pushed and moved to the scum receiving inlet 30 by the dynamic pressure of the upper-layer swirling flow HR. Therefore, even if the contaminated water CW flows slow as a whole, the floating coating scum F is quickly moved to the scum receiving inlet 30 and can thus be efficiently collected. In addition, since the upper-layer swirling flow HR of the contaminated water CW is generated by using the wind pressure of the contaminated air CA discharged from the coating booth 10, energy saving can be achieved compared with the case where a separate power source is provided. Here, even if a part of floating coating scum F deviates from the contaminated water guide 32 due to too much floating coating scum F, the floating coating scum F is directed to the contaminated water guide 32 by the upper-layer swirling flow HR again and again, so that even a large amount of floating coating scum F can be surely guided to the scum receiving inlet 30.

In addition, the floating coating scum F taken into the scum receiving inlet 30 is stored in the storage chamber 27 which is hardly affected by the flow of the upper-layer flow. Then, since the floating coating scum F is discharged to the outside through the suction pipe 39 which is opened upward in the vicinity of the gentle water surface in the storage chamber 27, the amount of water discharged together with the floating coating scum F can be reduced. In addition, since the suction pipe 39 is provided with the float 38 for causing the upper surface opening to follow the surface of the contaminated water CW, the amount of water discharged together with the floating coating scum F can also be reduced in this respect.

Second Embodiment

Figure 4:
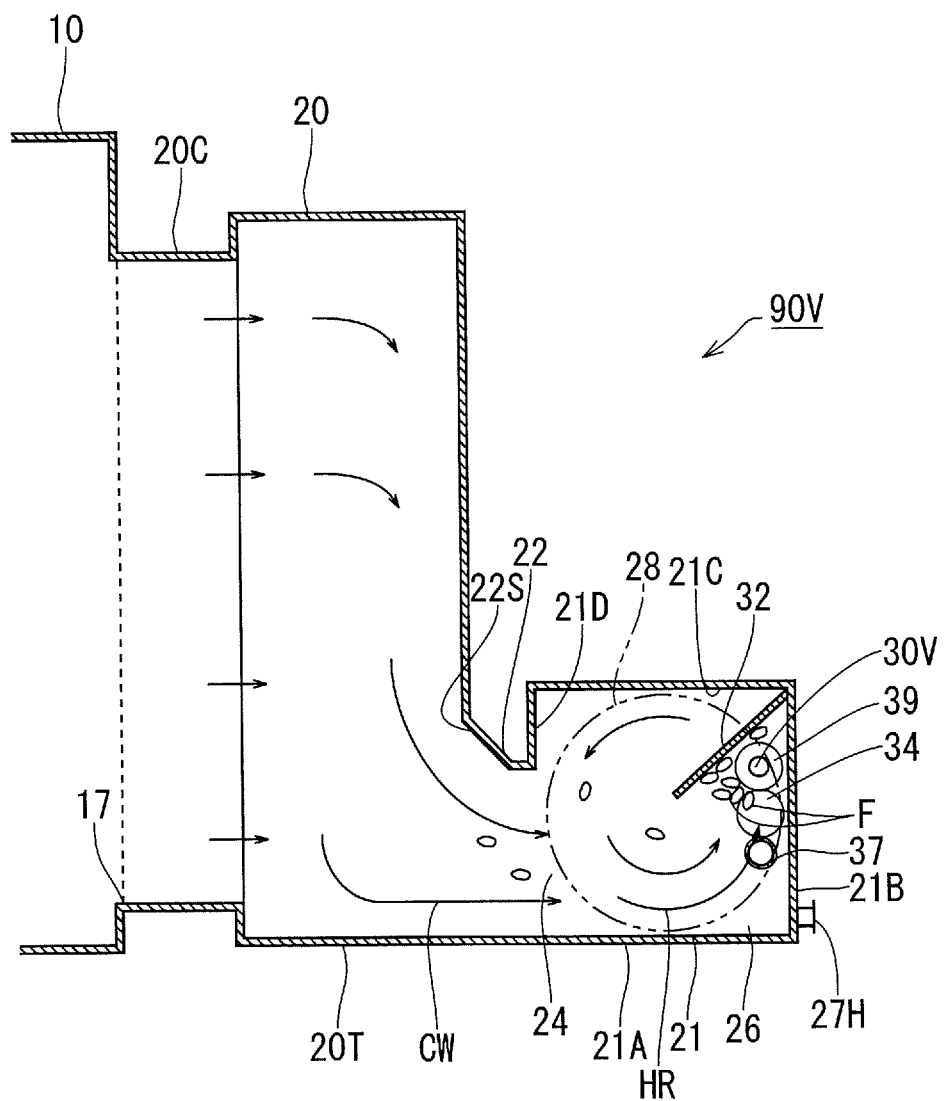
FIG. 4 is a plan sectional view of an exhaust/drainage mechanism of a second embodiment.

An exhaust/drainage mechanism 90V of the present embodiment is shown in FIG. 4, and the exhaust/drainage mechanism 90V is made by removing the storage chamber 27 from the exhaust/drainage mechanism 90 of the first embodiment and by disposing the above-mentioned suction pipe 39 between a side wall 21B of the vortex flow generation chamber 26 and the contaminated water guide 32. In the configuration of the present embodiment, the upper surface opening of the suction pipe 39 corresponds to a scum receiving inlet 30V according to the present invention, and it is possible to efficiently collect the floating coating scum F in the scum receiving inlet 30V.

Other Embodiments

The present invention is not limited to the above embodiments, and, for example, the embodiments described below are also included in the technical scope of the present invention. In addition, other than the following embodiments, the present invention can be variously modified and practiced without departing from the spirit of the invention.

Figure 5:
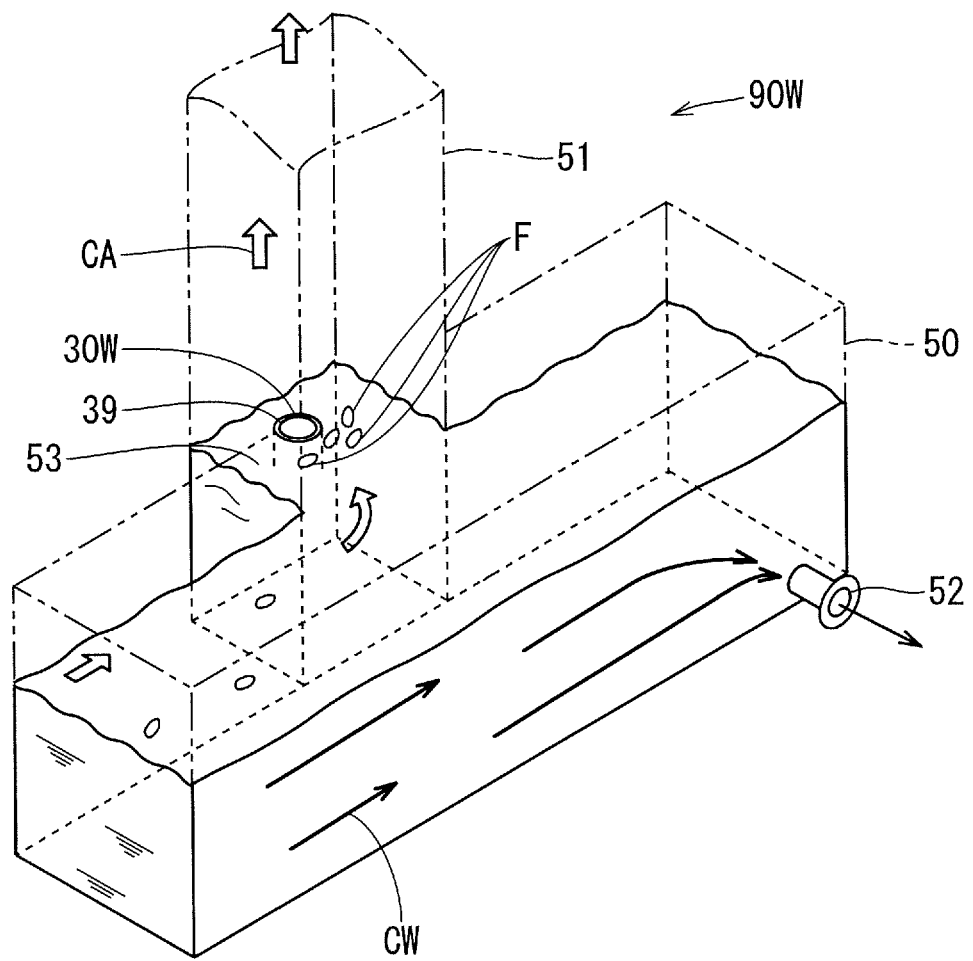
FIG. 5 is a perspective view of an exhaust/drainage mechanism according to a modified example of the present invention.

(1) In the first and second embodiments, the upper-layer flow of the contaminated water CW is swirled by the wind pressure of the contaminated air CA, but the upper-layer flow of the contaminated water CW may not be swirled. Specifically, for example, as shown in FIG. 5, an exhaust/drainage mechanism 90W may be configured as follows. A blind alley part 53 is provided to project sideward from the middle position of a dual-purpose flow channel 50 extending substantially horizontally, an exclusive exhaust duct 51 is extendingly provided upward from the blind alley part 53, the suction pipe 39 described in the first embodiment is provided in a deep part of the blind alley part 53, and a drainage port 52 is provided on a lower end part of the dual-purpose flow channel 50. In this configuration, the contaminated air CA flows from the dual-purpose flow channel 50 to the blind alley part 53 and the exclusive exhaust duct 51, and the contaminated water CW is discharged to the outside from the drainage port 52 at the lower end part of the dual-purpose flow channel 50. Further, an upper-layer flow is generated on the upper part of the contaminated water CW so as to flow from the dual-purpose flow channel 50 to the blind alley part 53 by the wind pressure of the contaminated air CA, and a dynamic pressure of the upper-layer flow can push and move the floating coating scum F toward an upper surface opening of the suction pipe 39 functioning as a scum receiving inlet 30W.

(2) In the first embodiment, an aggregating agent is added to the water ejected from the fountain parts 14 in the coating booth 10, but the aggregating agent may be added to the contaminated water CW on the downstream side, of the discharge port 17, outside the coating booth 10.

REFERENCE SIGNS LIST

10 Coating booth
20 First flow channel (Dual-purpose flow channel)
20C Relay duct (Dual-purpose flow channel)
21 Second flow channel (Dual-purpose flow channel)
24 Passing part
25 Separation wall
26 Vortex flow generation chamber (Extended part)
27 Storage chamber
28 Dust separator
30 Scum receiving inlet
31 Internal door
32 Contaminated water guide
34 Suction pump
35 Maintenance window
36 External door
37 Discharge pipe
38 Float
39 Suction pipe
50 Dual-purpose flow channel
51 Exclusive exhaust duct (Exhaust channel)
53 Blind alley part (Dual-purpose flow channel)
90, 90V, 90W Exhaust/drainage mechanism
F Floating coating scum
CA Contaminated air
CW Contaminated water
HR Upper-layer swirling flow

The invention claimed is:
1. An exhaust/drainage mechanism comprising:
a dual-purpose flow channel having:
an upper part through which contaminated air discharged from a coating booth together with non-attached paint flows;
a lower part through which contaminated water discharged from the coating booth together with non-attached paint flows;
a first flow channel extending along one side surface of the coating booth;
a second flow channel extending orthogonally to the first flow channel and horizontally from one end part on a downstream side of the first flow channel;
an extended part that is (i) on a downstream side of a passing part of the dual-purpose flow channel, (ii) located at a middle of the dual-purpose flow channel, (iii) wider than the passing part, and (iv) configured to generate an upper-layer swirling flow by swirling the contaminated water flowing from the passing part;
an internal protruding wall (i) protruding in an extending direction of the first flow channel from an inner side corner formed between the first flow channel and the second flow channel and (ii) narrowing the passing part from the first flow channel to the extended part;
a first inner side surface (i) opposing the internal protruding wall so as to interpose the passing part between the first inner side surface and the internal protruding wall and (ii) guiding the contaminated air and the contaminated water flowing in the first flow channel toward the extended part;
a second inner side surface opposing the first inner side surface so that the extended part is interposed between the second inner side surface and the first inner side surface in the second flow channel; and
a third inner side surface connected to the second inner side surface and opposing a separation wall from an upper-stream side of the second flow channel;
a dust separator having a suction port disposed above the extended part, the dust separator configured to (i) suck the contaminated air upward from the suction port, (ii) centrifugally separate dust, and (iii) drop the centrifugally-separated dust in the contaminated water in the dual-purpose flow channel;
a storage chamber on a downstream side of the extended part and separated from the extended part by the separation wall, the separation wall (i) being provided in a middle part in a longitudinal direction of the second flow channel and (ii) separating the dual-purpose flow channel on a side above the contaminated water into the extended part and the storage chamber;
a scum receiving inlet provided in the separation wall to take into the storage chamber floating coating scum floating on the contaminated water;
a suction pipe which is opened upward in a vicinity of a surface of the contaminated water in the storage chamber and into which the floating coating scum flows; and
a contaminated water guide (i) disposed at the extended part, (ii) having a plate shape partly submerged in the contaminated water, and (iii) extending linearly in a radial direction from a center of the upper-layer swirling flow to a corner portion between the separation wall and the second inner side surface to guide the floating coating scum together with a surface layer portion of the contaminated water into the scum receiving inlet.

2. The exhaust/drainage mechanism according to claim 1, further comprising:
   a maintenance window formed on an outer wall of the storage chamber;
   an external door which opens and closes the maintenance window; and
   an internal door which opens and closes the scum receiving inlet.

3. The exhaust/drainage mechanism according to claim 1, wherein the suction pipe includes:
   a float which moves up and down following the surface of the contaminated water; and
   an operation part which extends and contracts or moves according to a vertical movement of the float.

4. The exhaust/drainage mechanism according to claim 2, wherein the suction pipe includes:
   a float which moves up and down following the surface of the contaminated water; and
   an operation part which extends and contracts or moves according to a vertical movement of the float.

* * * * *